(12) United States Patent
Gogolla et al.

(10) Patent No.: US 10,788,581 B2
(45) Date of Patent: *Sep. 29, 2020

(54) DEVICE FOR OPTICALLY MEASURING THE DISTANCE FROM A REFLECTIVE TARGET OBJECT

(71) Applicant: Hilti Aktiengesellschaft, Schaan (LI)

(72) Inventors: Torsten Gogolla, Schaan (LI); Andreas Winter, Feldkirch (AT)

(73) Assignee: Hilti Aktiengesellschaft, Schaan (LI)

( * ) Notice: Subject to any disclaimer, the term of this patent is extended or adjusted under 35 U.S.C. 154(b) by 352 days.

This patent is subject to a terminal disclaimer.

(21) Appl. No.: 15/575,299

(22) PCT Filed: May 11, 2016

(86) PCT No.: PCT/EP2016/060485
§ 371 (c)(1),
(2) Date: Nov. 17, 2017

(87) PCT Pub. No.: WO2016/184733
PCT Pub. Date: Nov. 24, 2016

(65) Prior Publication Data
US 2018/0149749 A1    May 31, 2018

(30) Foreign Application Priority Data

May 18, 2015   (EP) .................................... 15167961

(51) Int. Cl.
*G01C 3/08*     (2006.01)
*G01S 17/08*    (2006.01)
(Continued)

(52) U.S. Cl.
CPC ............. *G01S 17/08* (2013.01); *G01S 7/4811* (2013.01); *G01S 7/4814* (2013.01); *G02B 7/006* (2013.01);
(Continued)

(58) Field of Classification Search
CPC ...... G01S 17/08; G01S 7/4814; G01S 7/4811; G01S 7/006; G02B 27/0955; G02B 27/0988
(Continued)

(56) References Cited

U.S. PATENT DOCUMENTS 6,411,371 B1   6/2002  Hinderling et al.
7,800,643 B2   9/2010  Hama
(Continued)

FOREIGN PATENT DOCUMENTS

CN    1888813 A    1/2007
CN    102809747 A   12/2012
(Continued)

OTHER PUBLICATIONS

PCT/EP2016/060485, International Search Report dated Jun. 30. 2016 (Three (3) pages).

(Continued)

*Primary Examiner* — Mark Hellner
(74) *Attorney, Agent, or Firm* — Crowell & Moring LLP (57) ABSTRACT

A device for optically measuring the distance from a reflective target object is disclosed. The device includes a beam source, a detector, a beam shaping system with a transmitter lens and a receiver lens and a laser beam shaping element which can be positioned in the beam path of the laser beam. The laser beam shaping element is embodied as a transmission aperture system with at least one transmission aperture, where at least one transmission aperture creates a partial beam and the partial beam widens to one or more beam angles which are no smaller than a minimum critical angle of 1.0 mrad.

17 Claims, 6 Drawing Sheets

(51) Int. Cl.
*G01S 7/481* (2006.01)
*G02B 7/00* (2006.01)
*G02B 27/09* (2006.01)

(52) U.S. Cl.
CPC ..... *G02B 27/0955* (2013.01); *G02B 27/0988* (2013.01)

(58) Field of Classification Search
USPC ....................................................... 356/5.01
See application file for complete search history.

(56) References Cited

U.S. PATENT DOCUMENTS

| | | | |
|---|---|---|---|
| 8,919,002 B2 | 12/2014 | Dang | |
| 9,261,362 B2 | 2/2016 | Gogolla et al. | |
| 9,791,566 B2* | 10/2017 | Winter | G01S 17/08 |
| 2006/0290781 A1 | 12/2006 | Hama | |
| 2013/0135604 A1 | 5/2013 | Gogolla et al. | |
| 2016/0054446 A1* | 2/2016 | Winter | G01S 17/08 356/4.01 |

FOREIGN PATENT DOCUMENTS

| | | |
|---|---|---|
| CN | 103175515 A | 6/2013 |
| DE | 197 27 988 A1 | 1/1998 |
| DE | 198 40 049 A1 | 4/2000 |
| DE | 102 50 583 A1 | 5/2003 |
| DE | 10 2013 505 589 A1 | 10/2014 |
| EP | 1 154 284 A1 | 11/2001 |
| EP | 2 096 459 A2 | 9/2009 |
| JP | 2007-10346 A | 1/2007 |
| JP | 2009-63383 A | 3/2009 |

OTHER PUBLICATIONS

European Search Report issued in European counterpart application No. 15167961.0-1812 dated Oct. 22, 2015, with Statement of Relevancy (Eight (8) pages).
U.S. Patent Application, "Device for Optically Measuring the Distance from a Reflective Target Object", filed Nov. 17, 2017, Inventor: Torsten Gogolla et al.
U.S. Patent Application, "Device for Optically Measuring the Distance from a Reflective Target Object", flied Nov. 17, 2017, Inventor: Torsten Gogolla et al.

* cited by examiner

DEVICE FOR OPTICALLY MEASURING THE DISTANCE FROM A REFLECTIVE TARGET OBJECT

This application claims the priority of International Application No. PCT/EP2016/060485, filed May 11, 2016, and European Patent Document No. 15167961.0, filed May 15, 2015, the disclosures of which are expressly incorporated by reference herein.

BACKGROUND AND SUMMARY OF THE INVENTION

This invention relates to a device for optically measuring distance from a reflective target object.

DE 197 27 988 A1 reveals a known device for optically measuring distance from a reflective target object, consisting of a telescope, a distance measuring device and an adjustment device for adjusting the divergence angle of the laser beam. The distance measuring device consists of a beam source which sends out a laser beam, a detector which receives a reception beam reflected from the target object, and a beam shaping system with a transmitter lens for beam shaping of the laser beam and a receiver lens for beam shaping of the reception beam. The laser beam divergence can be altered via the exit angle of the laser beam at the beam source, via the optical path length between the beam source and the transmitter lens or by an additional transmitter lens after the beam source. It is disadvantageous that all the proposed measures for adjusting the divergence angle of the laser beam occur within the distance measuring device and reduce the stability of the distance measuring device.

A device for optically measuring distance from a reflective target object is known from DE 198 40 049 A1. The device consists of a distance measuring device and an adjustment device for adjusting the laser beam to the target object. The distance measuring device consists of one or two beam sources, a detector and a beam shaping with a transmitter lens and a receiver lens. The one or two beam sources create a first laser beam with a large beam divergence and a second laser beam with a small beam divergence, whereby the first laser beam is intended for measuring the distance from scattered target objects and the second laser beam is intended for measuring the distance from reflective target objects.

The selection of a suitable laser beam may be made at the beam source or at the detector. In one embodiment, the first and second laser beams are simultaneously transmitted and hit the target object. Optical filters, which only let the first or the second laser beam through, are arranged in front of the detector in the beam path of the reception beam. The optical filters are arranged in a manually operable or motor-driven filter wheel or filter slides, which place individual optical filters into the beam path of the reception beam. It is disadvantageous that two laser beams with differing beam divergences are required in order to adjust the distance measurement to the target object. In order to create the different beam divergences, several beam paths and beam shaping lenses are required, which increases the space requirement.

DE 10 2013 205 589 A1 discloses another known device for optical measurement of the distance from a reflective target object, consisting of a distance measurement device and an adjustment device, which is positioned outside of the distance measurement device. The distance measurement device consists of a beam source, a detector and a beam shaping system with a transmitter lens and a receiver lens. The adjustment device consists of at least one laser beam shaping element, which can be positioned in the beam path and which is embodied as a diffusion lens. In order to be able to adjust the laser beam to different ranges of distance from reflective target objects, several laser beam shaping elements are included, embodied as diffusion lenses, which differ from one another in their diffusion properties. In one refinement, the adjustment device comprises at least one element for shaping the reception beam, which can be positioned in the beam path of the reception beam and which is embodied as a diffuser. The reception beam can be attenuated with the aid of the diffuser, to avoid overloading the detector. In order to be able to adjust the reception beam to different ranges of distance from reflective target objects, several elements for shaping the reception beam are included, embodied as diffusers, which differ from one another in their light diffusion properties.

The known device for the optical measurement of distance from a reflective target object has the disadvantage that extraneous light, for example in the form of direct or indirect sunlight, increases measurement error in the case of distance measurement with a fixed measurement time and thus can impair the accuracy of the measurement results or increases the measurement time required for the distance measurement. By way of contrast to the laser beam, extraneous light is not directional, but rather can penetrate from various directions. The elements for shaping the reception beam, embodied as diffusers, attenuate extraneous light far more weakly than the directional reception beam. When using surface retroreflectors, the known device for optical measurement of distance has further disadvantages because of the beam widening caused by the diffusion lens. If the surface retroreflector is not positioned perpendicular to the optical axis of the impinging light, the minimum distance is not measured on the optical axis of the laser beam and the distance measured by the distance measuring device shows a deviation from the actual distance. The more the laser beam is widened by the diffusion lens, the more this deviation increases.

The object of this invention is the development of a device for optically measuring the distance from a reflective target object, which is suited to measuring the distance from individual retroreflectors and with which extraneous light is attenuated with little instrument-based effort. The device shall also be suitable for optically measuring the distance from surface retroreflectors.

According to the invention, the device for optically measuring the distance from a reflective target object is characterized in that the element for shaping the laser beam is embodied as a transmission aperture system with at least one transmission aperture, whereby at least one transmission aperture creates a partial beam and widens the partial beam to one or more beam angles which are no less than a minimum critical angle of 1.0 mrad. An element for shaping the laser beam, embodied as a transmission aperture system with at least one transmission aperture, which creates a partial beam with beam angles greater than 1.0 mrad is suitable for optically measuring the distance from individual retroreflectors. The minimum critical angle of 1.0 mrad for the beam angle ensures that in the case of measuring distance from an individual retroreflector, a large widening of the laser beam occurs. In the case of beam angles greater than 1.0 mrad, sufficient widening of the partial beam is ensured so that the partial beam detects the center of the individual retroreflector. If the partial beam does not hit the center of the individual retroreflector, there is a risk that the reflected reception beam misses the receiver lens and the detector of the distance measuring device due to parallel offset.

A transmission aperture is characterized by its area and its dimensions. The aperture geometry of the transmission aperture determines whether the partial beam has one or more beam angles. Transmission apertures with a circular or square aperture geometry are defined by one dimension (circle radius, lateral length of the square) and create partial beams after the transmission aperture which have a circular beam cross-section with a beam angle which is constant in circumferential direction. Transmission apertures with an elliptical or rectangular geometry are defined by two dimensions and create partial beams after the transmission aperture which have an elliptical beam cross-section with a beam angle which varies in circumferential direction, whereby the beam angle of the elliptical partial beam varies in circumferential direction between a maximum beam angle on the large half-axis and a minimum beam angle on the small half-axis of the elliptical beam cross-section. Transmission apertures with an arbitrary aperture geometry create partial beams after the transmission aperture with several beam angles between a maximum beam angle and a minimum beam angle.

The beam angles of the partial beam created by the transmission aperture can be configured via the dimensions of the transmission aperture. The minimum critical angle of 1.0 mrad can be converted to a maximum dimension for the transmission aperture which must not be exceeded if the beam angle of the partial beam should not fall below the minimum critical angle of 1.0 mrad. The smaller the dimensions of the transmission aperture, the larger the beam angles of the partial beam in the beam path after the transmission aperture. In order to achieve good measuring performance when measuring distance, it is advantageous to use transmission apertures with differing dimensions and thus beam angles in different distance ranges. It thereby applies that the beam angle of the partial beam should reduce with increasing distance, i.e., large beam angles are advantageous at close range and beam angles in the area of the minimum critical angle of 1.0 mrad are advantageous at long ranges.

In a preferred refinement, the transmission aperture system has several transmission apertures, whereby the transmission apertures create several partial beams and the partial beams respectively widen to one or more beam angles, which are no smaller than the minimum critical angle of 1.0 mrad. The accuracy required in directing the laser beam onto an individual retroreflector can be reduced by using several transmission apertures. After the transmission aperture, the partial beam initially has a small beam diameter, which at a short range of a few metres would make it necessary to direct the laser beam after the transmission aperture system precisely onto the individual retroreflector. In the case of several transmission apertures, the diameters of the partial beams add up and enlarge the beam diameter. A central transmission aperture, which is arranged coaxially to the optical axis of the laser beam before the transmission aperture system, and a circular distribution of other transmission apertures around the central transmission aperture, for example, are suitable as a transmission aperture system for measuring the distance from individual retroreflectors. The partial beams which are created by the various transmission apertures and which merge after the transmission aperture system into one laser beam should have the same beam angle, preferably a beam angle which is constant in circumferential direction. The transmission apertures preferably have the same aperture geometry and the same dimensions.

Transmission apertures which are partially transparent for the laser beam are particularly preferable. The radiant power of the transmitted laser beam is configured for measuring the distance from scattered target objects. In the case of scattered target objects, the laser beam is diffused over a large angular field; only a small part of the radiant power is captured by the receiver lens and forwarded to the detector. In the case of measuring the distance from an individual retroreflector, the laser beam is reflected on the target object and impinges on the detector as a directional reception beam. In order to avoid overloading the detector, the radiant power of the reception beam impinging on the detector must be significantly less than the radiant power of the laser beam transmitted from the beam source. Thereby the radiant power can be reduced via measures in the beam path of the laser beam and/or via measures in the beam path of the reception beam. The radiant power of the laser beam can be adjusted via the transmission area of the transmission aperture system and via the transparency of the transmission apertures. The transmission area of a transmission aperture system is generally defined as the sum of the individual areas of the transmission apertures. If the transmission apertures have the same dimensions, the transmission area can be calculated as the product of the number of transmission apertures and the area of the transmission apertures. The transparency of the transmission apertures only influences the radiant power, whereas changes in the transmission area can also change the beam angle of the partial beams as well as the radiant power. It is true for all aperture geometries of transmission apertures that their area is dependent on the dimensions of the transmission apertures, which also determine the beam angles of the partial beams. It is possible to adjust the radiant power via the transparency of the transmission apertures, without changing the beam angle of the partial beams.

The transparency of the transmission apertures is configured for example via optical filters, which are embodied as neutral density filters, also called grey filters, or as color filters. A color filter has a low transmission factor in a narrow wavelength range, while shorter and longer wavelengths are almost completely let through. As neutral density filters, optical grade glass or plastic filters are homogenously colored neutral grey and achieve uniform attenuation. In the case of neutral density filters, a broad wavelength range is attenuated, whereas with color filters a narrow wavelength range around the wavelength of the beam source, e.g., ±15 nm, is attenuated. The radiant power of the partial beam or the partial beams can be configured via the transmission factor of the optical filter. The transmission factor is defined as the ratio of radiant power let through to radiant power lost.

In a preferred refinement of the device according to invention, a first element for shaping the laser beam which can be positioned in the beam path of the laser beam and is embodied as an initial transmission aperture system with at least one initial transmission aperture, and a second element for shaping the laser beam which can be positioned in the beam path of the laser beam and is embodied as a second transmission aperture system with at least a second initial transmission aperture, are provided for, whereby the first and second transmission aperture systems are different from one another. The use of different transmission aperture systems enables the device according to invention to be adjusted for optically measuring distances at various ranges of distance in which individual retroreflectors are positioned, and various sizes of individual retroreflectors. Thereby, above all the number of transmission apertures, the area of the transmission apertures, the dimensions of the transmission apertures and/or the transparency of the transmission apertures are suitable for adjusting the device according to invention to the distance and/or the size of an individual retroreflector.

It is particularly preferable that the dimensions of the first and second transmission apertures are different from one another. The beam angles of the partial beams can be adjusted via the dimensions of the transmission apertures. The use of different dimensions enables the transmission aperture systems to be adjusted to different distances and different sizes of individual retroreflectors. The greater the distance to the target object, the smaller the beam angle of the partial beams should be, whereby the beam angles of the partial beams should in any case be greater than the minimum critical angle of 1.0 mrad.

It is particularly preferable that the first and second transmission apertures differ from one another in the number of transmission apertures, in the area of the transmission apertures and/or in the transparency of the transmission apertures. The reduction of the radiant power of the reception beam, which is necessary in the case of an individual retroreflector, can be achieved via the transmission area of the transmission aperture system and via the transparency of the transmission apertures. The smaller the ratio of the transmission area to the cross-sectional area of the laser beam directly before the transmission aperture system, the smaller the transmitted part of the laser beam. In addition to the transmission area, the radiant power of the laser beam can be adjusted via the transparency of the transmission apertures. Also, the transmission apertures can be equipped with an optical filter, whereby the radiant power of the laser beam can be configured via the transmission factor of the optical filter.

In a preferred refinement of the device according to invention, another element for shaping the laser beam is provided for, which can be positioned in the beam path of the laser beam and which is embodied as a shaping aperture, whereby the shaping aperture reshapes the laser beam into a shaped laser beam with one or more beam angles and the beam angles are smaller than a maximum critical angle of 0.3 mrad. An element for shaping the laser beam, embodied as a shaping aperture, which creates a shaped laser beam, with beam angles smaller than 0.3 mrad, is suitable for optically measuring the distance from surface retroreflectors. The maximum critical angle of 0.3 mrad ensures that there is a homogenization of the laser beam when measuring the distance from surface retroreflectors, whereas there is a large widening of the laser beam when measuring the distance to individual retroreflectors, which is ensured by the definition of a minimum critical angle of 1.0 mrad. The beam angle of the shaped laser beam can be configured via the dimensions of the shaping aperture. It thereby applies that the larger the dimensions of the shaping aperture, the smaller the beam angle of the shaped laser beam.

A shaping aperture is characterized by its area and its dimensions. The aperture geometry of the shaping aperture determines whether the shaped laser beam has one or more beam angles. Shaping apertures with a circular or square aperture geometry are defined by one dimension (circle radius, lateral length of the square) and create laser beams which have a circular beam cross-section with a beam angle which is constant in circumferential direction. Shaping apertures with an elliptical or rectangular aperture geometry are defined by two dimensions and create laser beams which have an elliptical beam cross-section with a beam angle which varies in circumferential direction, whereby the beam angle of the elliptical laser beam varies in circumferential direction between a maximum beam angle on the large half-axis and a minimum beam angle on the small half-axis of the elliptical beam cross-section.

In the case of devices according to invention, the transmission apertures and shaping apertures are distinguished by their dimensions. The transmission aperture is used when measuring distances from individual retroreflectors and the shaping aperture is used when measuring distances from surface retroreflectors. The minimum critical angle of 1.0 mrad is defined for measuring distances from individual retroreflectors and the maximum critical angle of 0.3 mrad is defined for measuring distances from surface retroreflectors. The minimum critical angle of 1.0 mrad can be converted into a maximum dimension for the transmission aperture, which must not be exceeded by the transmission aperture, and the maximum critical angle of 0.3 mrad can be converted into a minimum dimension for the shaping aperture, which must not be fallen short of by the shaping aperture.

It is particularly preferable that the shaping aperture is partially transparent for the laser beam. The radiant power of the transmitted laser beam is designed for measuring the distance from scattered target objects, in which case only a small part of the radiant power is captured by the receiver lens and forwarded to the detector. When measuring the distance from a surface reflector, the laser beam is reflected off the target object and impinges on the detector as a directional reception beam. In order to prevent overloading of the detector, the radiant power of the reception beam impinging on the detector must be considerably smaller than the radiant power of the laser beam transmitted from the beam source. The radiant power of the laser beam can be adjusted via the area of the shaping aperture and via the transparency of the shaping aperture. The transparency of the shaping aperture only influences the radiant power, whereas the area of the shaping aperture, which is dependent on the dimensions, changes the radiant power and the beam angle. It is possible to adjust the radiant power via the transparency of the shaping aperture without changing the beam angle of the laser beam. The transparency of the shaping aperture is configured for example by optical filters, which are embodied as neutral density filters or as color filters. The radiant power of the laser beam can be configured via the transmission factor of the optical filter.

It is particularly preferable that a first shaping aperture which can be positioned in the beam path of the laser beam and a second shaping aperture which can be positioned in the beam path of the laser beam are provided for, whereby the first and second shaping apertures are different from one another in the dimensions of the shaping apertures, in the area of the shaping apertures and/or in the transparency of the shaping apertures. The use of different shaping apertures enables the adjustment of the device according to the invention to different distances at which a surface retroreflector is positioned, and to the size of surface retroreflectors. The beam angles of the shaped laser beam can be configured via the dimensions of the shaping aperture. The larger the dimensions of the shaping aperture, the smaller the beam angles of the shaped laser beam; and, the greater the distance of the distance measuring device from the target object, the smaller the beam angle of the laser beam should be.

In a preferred refinement of the device according to invention, an element for shaping the reception beam is provided for, which can be positioned in the beam path of the reception beam and which is embodied as a reception aperture system with at least one reception aperture. The reduction in the radiant power of the impinging reception beam which is necessary in the case of reflective target objects (individual retroreflectors or surface retroreflectors) can take place via the reception aperture system with at least one reception aperture. The radiant power of the reception beam can be configured via the reception area of the reception aperture system and the transparency of the reception apertures. The reception area of a reception aperture system is generally defined as the sum of the individual areas. If the reception apertures have the same dimensions, the reception area can be calculated as the product of the number of reception apertures and the area of the reception apertures. The smaller the ratio of the reception area to the cross-sectional area of the reception beam directly before the reception aperture system, the lower the radiant power of the reception beam. The attenuation of the reception beam via a restriction of the reception area is independent of the wavelength of the beam source, so extraneous light, for example in the form of sunlight with a broad wavelength spectrum, is also attenuated. The attenuation of extraneous light occurs without additional instrument-based effort.

It is particularly preferable that the reception aperture system has several reception apertures which are spaced apart from one another. The use of a reception aperture system with several reception apertures which are distributed across the beam cross-section of the reception beam leads to a homogenization of the reception beam. Homogenization is primarily suitable for reception beams which have an inhomogenization distribution across the beam cross-section. The reception area can be adjusted via the number of reception apertures and the area of the reception apertures.

It is particularly preferable that the reception apertures are embodied as partially transparent for the reception beam. As an alternative to the reception area, or in addition to the reception area, the radiant power of the reception beam can be adjusted via the transparency of the reception apertures. Thereby, reception apertures equipped with an optical filter are particularly preferable, whereby the radiant power of the reception beam can be configured via the transmission factor of the optical filter. Neutral density filters which attenuate a broad wavelength spectrum and also attenuate extraneous light in addition to the reception beam are suitable as optical filters for partially transparent reception apertures. Extraneous light is attenuated without additional instrument-based effort by using neutral density filters.

In a preferred refinement, a first element for shaping the reception beam, which can be positioned in the beam path of the reception beam and is embodied as a first reception aperture system with at least one reception aperture, and a second element for shaping the reception beam, which can be positioned in the beam path of the reception beam and is embodied as a second reception aperture system with at least a second reception aperture, are provided for, whereby the first and second reception aperture systems are different from one another. The use of different reception aperture systems enables the adjustment of the device according to invention to different distances, at which a reflective target object is positioned, to different types of reflective target objects (individual retroreflectors or surface retroreflectors) and to different sizes of reflective target objects. Thereby, primarily the number of reception apertures, the area of the reception apertures and/or the transparency of the reception apertures are suitable for adjusting the device according to invention to the range, the type and the size of the reflective target object.

It is particularly preferable that the first and second reception aperture systems differ from one another in the number of reception apertures, in the area of the reception apertures and/or in the transparency of the reception apertures. The radiant power of the reception beam can be adjusted via the reception area of the reception aperture system and via the transparency of the reception apertures. Thereby, the reception area is configured via the number of reception apertures and/or the area of the reception apertures. The smaller the ratio of the reception area to the cross-sectional area of the reception beam directly before the reception aperture system, the smaller the radiant power of the reception beam. The reception area should be enlarged with the increasing distance of the reflective target object from the distance measuring device. As an alternative or in addition to the reception area of the reception aperture system, the radiant power of the reception beam can be adjusted via the transparency of the reception apertures. Thereby, it is particularly preferable that the reception apertures are equipped with a neutral density filter, whereby the transparency of the reception apertures is configured via the transmission factor of the neutral density filter. The use of neutral density filters for attenuating the reception beam has the benefit that extraneous light is also attenuated in addition to the reception beam. Extraneous light is attenuated without additional instrument-based effort by using neutral density filters.

In a first preferred refinement of the device according to invention, an element for shaping the laser beam, embodied as a transmission aperture system, and an element for shaping the reception beam, embodied as a reception aperture system, are arranged on a first shaping element, whereby the first shaping element can be positioned in the beam path of the laser beam and the beam path of the reception beam. The arrangement of a transmission aperture system and a reception aperture system on a first shaping element is suitable for measuring the distance from individual retroreflectors and reduces the effort and the space requirement, because the transmission and reception aperture systems are positioned, together in the beam path of the laser beam and of the reception beam. The transmission and reception aperture systems can be positioned coaxially or next to one another, whereby the suitable positioning of the transmission and reception aperture systems is determined by the positioning of the laser and reception beams.

In a second preferred refinement of the device according to invention, an element for shaping the laser beam, embodied as a shaping aperture, and an element for shaping the reception beam, designed as a reception aperture system, are positioned on a second shaping element, whereby the second shaping element can be positioned in the beam path of the laser beam and the beam path of the reception beam. The positioning of a shaping aperture and a reception aperture system on a second shaping element is suitable for measuring the distance from surface retroreflectors and reduces the effort and space requirement, because the shaping aperture and the reception aperture system are positioned together in the beam path of the laser beam and of the reception beam. The shaping aperture and the reception aperture system can be positioned coaxially or next to one another, whereby the suitable positioning of the shaping aperture and the reception aperture system is determined by the positioning of the laser and reception beams.

It is particularly preferable that at least a first shaping element and at least a second shaping element are provided for. A device according to invention which has at least a first shaping element and at least a second shaping element is suitable for optically measuring the distance from individual retroreflectors and surface retroreflectors. The first shaping element is designed for measuring the distance from individual retroreflectors and the second shaping element is designed for measuring the distance from surface retroreflectors.

It is particularly preferable that several first shaping elements and/or several second shaping elements are provided for. In the case of a device according to invention which has several first shaping elements, several second shaping elements or several first and second shaping elements, the beam-shaping characteristics of the elements shaping laser beams and reception beams can be adjusted to different distances, at which an individual retroreflector or a surface retroreflector is positioned. The first shaping elements are intended for optically measuring the distance from individual retroreflectors and the second shaping elements are intended for optically measuring the distance from surface retroreflectors.

Embodiments of the invention are hereinafter described on the basis of the drawings. This is not necessarily intended to represent the embodiments to scale, rather the drawings are provided in schematic and/or slightly distorted form, where it is useful for clarification.

Reference is made to the relevant prior art with regard to additions to the teaching directly identifiable from the drawings. It should thereby be noted that diverse modifications and changes affecting the form and the detail of an embodiment may be performed without deviating from the general idea of the invention. The features of the invention disclosed in the description, the drawings and the claims may be essential for the later version both in themselves and in arbitrary combination. Additionally, all combinations of at least two features disclosed in the description, the drawings and/or the claims fall within the scope of the invention. The general idea of the invention is not limited to the exact form or the detail of the preferable embodiment shown and described hereafter nor restricted to an object which would be limited in comparison to the object asserted in the claims. With the specified measurement ranges, also the values lying within the specified limits shall be disclosed as thresholds and arbitrarily applicable and claimable. For the sake of simplicity, the same reference signs shall be used hereafter for identical or similar parts or parts with identical or similar function.

DETAILED DESCRIPTION OF THE DRAWINGS

Figure 1A:
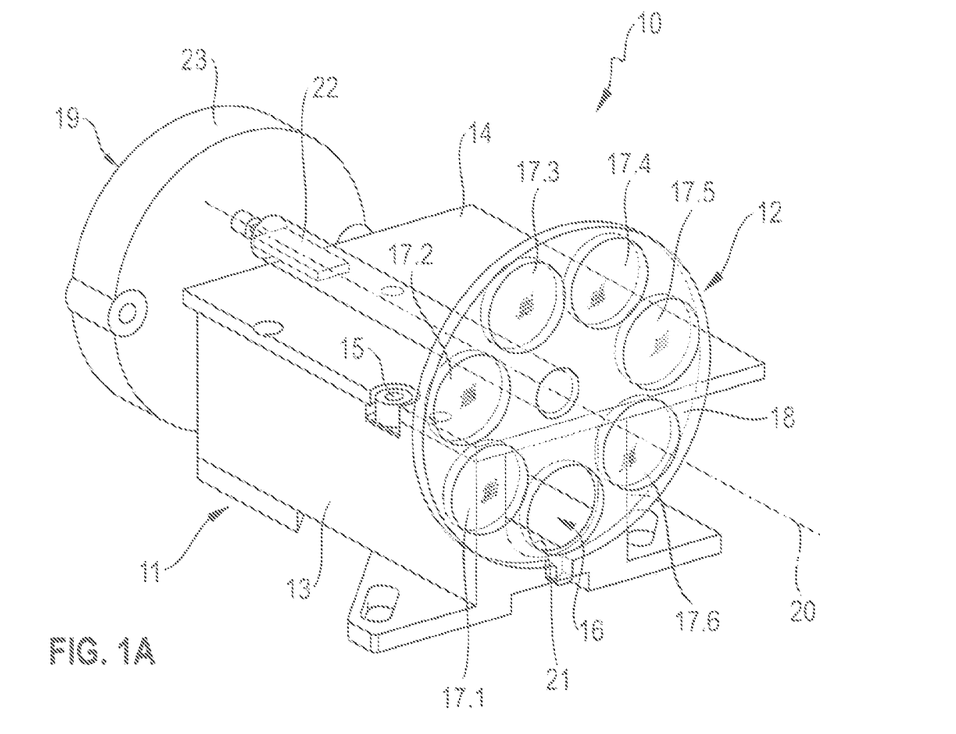
FIG. 1A, B show a device according to invention for optically measuring the distance from, a reflective target object, consisting of a distance measuring device and an automatically adjustable adjustment device with laser and reception beam shaping elements.

FIG. 1A shows a device 10 according to the invention for optically measuring the distance from a target object consisting of a distance measuring device 11 and a motor-driven adjustment device 12 which is positioned outside of the distance measuring device 11. In the case of target objects, a distinction is made between reflective target objects, which predominantly reflect an impinging laser beam, and scattered objects which predominantly diffuse an impinging laser beam.

In the case of reflective target objects, a differentiation is made between individual retroreflectors and surface retroreflectors. Individual retroreflectors are defined as reflective target objects consisting of a triple prism, whereby the dimensions of the prism are larger than the typical laser beam diameter and an impinging laser beam impinges on one surface of the triple prism. Examples of individual retroreflectors are triple prisms with diameters of 25 mm or 50 mm. Surface retroreflectors are defined as reflective target objects consisting of a number of prisms which are positioned next to one another in a flat plane, whereby the dimensions of the prisms are smaller than the typical laser beam diameter and an impinging laser beam impinges on several prisms. Examples of surface retroreflectors are reflection foils and cat's eyes. In the context of this application, cat's eyes are surface retroreflectors where the ratio of the size of the prisms to the laser beam diameter is between 0.1 and 1.0, and reflection foils are surface retroreflectors where the ratio of the size of the prisms to the laser beam diameter is smaller than 0.1.

The distance measurement device 11 consists of an optics carrier 13 and a circuit board 14 which is connected via a connection device 15 with the optics carrier 13. In the distance measuring device 11, a laser beam is created which exits the distance measuring device 11 via an uncoupling aperture 16 in the optics carrier 13 and impinges on the adjustment device 12. Using the adjustment device 12, the laser beam is adjusted to the features of the target object and the distance to the target object. In the embodiment, the adjustment device 12 consists of six different shaping elements 17.1-17.6, which are mounted in a rotating wheel 18 and are rotatable around a rotational axis 20 by means of a motor-driven drive system 19.

The shaping elements 17.1-17.6 of the adjustment device 12 respectively have a laser beam shaping element for shaping the beam of the laser beam and a reception beam shaping element for shaping the beam of the reception beam; the shaping elements 17.1-17.6 differ in their diffraction characteristics and/or attenuation characteristics and are intended for measuring the distance from reflective target objects at various ranges. In addition to the shaping elements 17.1-17.6, the rotating wheel 18 has an extra mounting in which no shaping element is inserted and no diffraction and/or attenuation of the laser beam and/or the reception beam occurs.

The rotating wheel 18 is locked to an axle element 22 which is rotatable by a drive motor 23 around the rotational axis 20; the rotational angle of the drive motor 23 is recorded by means of an angle sensor system. The rotational wheel 18 may as an alternative be driven around the rotational axis 20 via a manual rotational system. The rotational wheel 18 can be positioned in seven angular positions by rotation around the rotational axis 20. One of the shaping elements 17.1-17.6 is positioned in the laser beam in six angular positions and in the seventh angular position all shaping elements 17.1-17.6 are positioned outside of the laser beam and outside of the reception beam. The seventh position is intended for measuring the distance from scattered target objects.

Figure 1B:
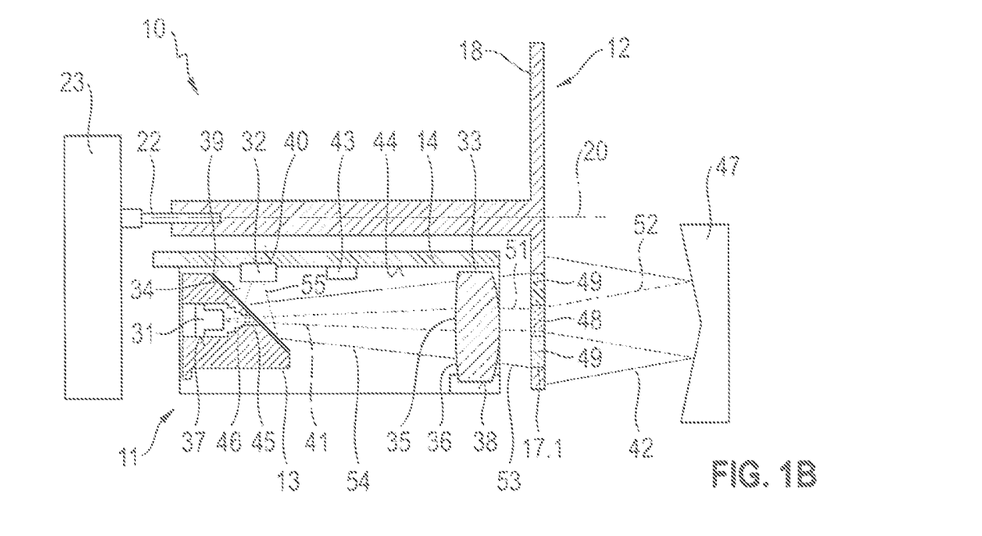

FIG. 1B shows the construction of the distance measuring device 11 and the motor-driven adjustment device 12 of the device according to invention 10 for optically measuring distance from FIG. 1A in detail.

The distance measuring device 11 consists of a first electro-optical component embodied as a beam source 31, a second electro-optical component embodied as a detector 32, a beam shaping system 33, a beam splitting lens 34, the optics carrier 13 and the circuit board 14. The beam shaping system 33 consists of a transmitter lens 35 for shaping the laser beam and a receiver lens 36 shaping the reception beam, which are integrated into a joint beam shaping lens 33. The beam source 31, the beam shaping lens 33 and the beam splitting lens 34 are mounted on the lens carrier 13 and the detector 32 is mounted to the circuit board 14. The lens carrier 13 has a first mounting 37 for the beam source 31, a second mounting 38 for the beam shaping lens 33 and a third mounting 39 for the beam splitting lens 34. The detector 32 on the circuit board 14 is mounted in another mounting 40.

The beam source 31 is embodied as a laser diode which generates a visible or infrared laser beam 41. The detector 32 is embodied as a photodiode which receives a reception beam 42 reflected and/or scattered by the target object. The beam splitting lens 34 splits the laser beam from the coaxially running reception beam; it is positioned in the beam path of the laser beam between the beam source 31 and the beam shaping lens 33 and the detector 32. The beam splitting lens 41 can be embodied as a polarization beam splitter, as a pinhole mirror or other beam splitting optical element. A control and analysis device 43 is connected with the beam source 31 and the detector 32 and determines the distance to the object from a time difference between a reference beam and the reception beam.

The detector 32 is positioned on a front side 44 of the circuit board 14 facing the lens carrier 13 and fixed to the circuit board by a soldered joint, whereby the detector 32 for example can be automatically fitted and soldered during the manufacture of the circuit board 14. The detector 32 is only mechanically held by the circuit board 14, there are no connection means directly connecting the detector 32 to the lens carrier 13. The lens carrier 13 is embodied open on one side, facing the detector 32, and connected to the circuit board 14 with a contact surface via the connection device 15.

The connection device 15 is embodied as being detachable during the calibration of the distance measurement device 11.

In the beam path of the laser beam 41, an aperture 45, which is integrated into the monolithic lens carrier 13, is positioned between the beam source 31 and the beam splitting lens 33. The aperture 45 serves to limit the beam angle of the beam source 31 and adjust the geometry of the laser beam 41 to the beam splitting lens 34 and the beam shaping lens 33. A light trap 46, which is integrated into the monolithic lens carrier 13 like the aperture 45, is positioned between the beam source 31 and the aperture 45. The light trap 46 serves to absorb impinging light and prevent undesired reflections. In addition, the light trap 46 is equipped on the inside with a low-reflection absorbent coating. Optical and electrical crosstalk from the beam source 31 to the detector 32 as well as disruptive artifacts in the laser beam are reduced by the aperture 45 and the light trap 46.

A reflective target object embodied as an individual retroreflector 47, which is a short distance from the distance measuring device 11, is used as a target object in the embodiment of FIG. 1B. The first shaping element 17.1 is in the beam path of the laser beam 41 and the reception beam 42. The first shaping element 17.1 has a laser beam shaping element 48 for the laser beam 41 and a reception beam shaping element 49 for the reception beam 42.

The beam source 31 transmits the laser beam 41, which is directed onto the beam splitting lens 34. The largest possible part of the laser beam 41 is transmitted to the beam splitting lens 34 and impinges on the transmitter lens 35, where a first beam shaping takes place. The first transmitter lens 35 is embodied as a collimating lens, which collimates the laser beam 41 and directs it as a collimated laser beam 51 onto the laser beam shaping element 48. The optical characteristics of the collimating lens 35 are aligned with measuring the distance of scattered target objects. The collimated laser beam 51 impinges on the laser beam shaping element 48, where the beam shaping and attenuation of the collimated laser beam 51 occurs. The shaped laser beam 52 impinges on the reflective target object 47.

The reception beam 42 reflected off the target object 47 impinges on the reception beam shaping element 49, which diffracts and attenuates the reception beam 42 and directs it as a shaped reception beam 53 onto the receiver lens 36. A further beam shaping of the reception beam 53 occurs at the receiver lens 36. The twice shaped reception beam 54 is directed onto the beam splitting lens 34 and deflected at the beam splitting lens. The deflected reception beam 55 impinges on the detector 32. The beam splitting lens 34 ensures that the optical axis of the diverted reception beam 55 and the optical axis of the transmitted laser beam 41 are different from one another.

Figure 2A:
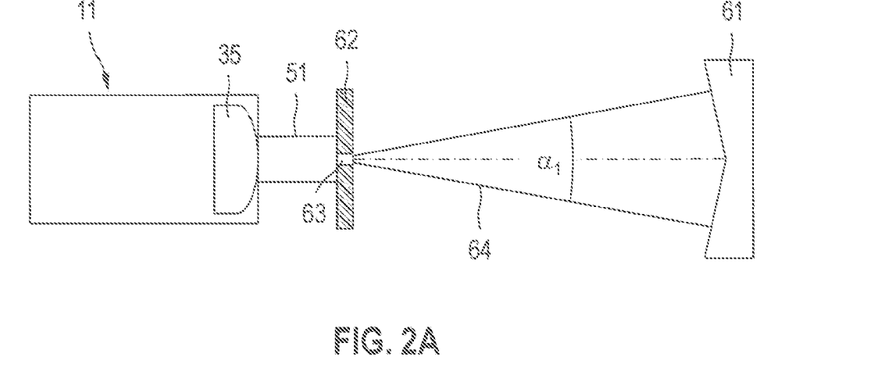
FIG. 2A, B show the optical measurement of the distance from an individual retroreflector with the aid of the device represented in FIG. 1, which comprises a transmission aperture system with one transmission aperture (FIG. 2A) or a transmission aperture system with several transmission apertures (FIG. 2B)
Figure 2B:
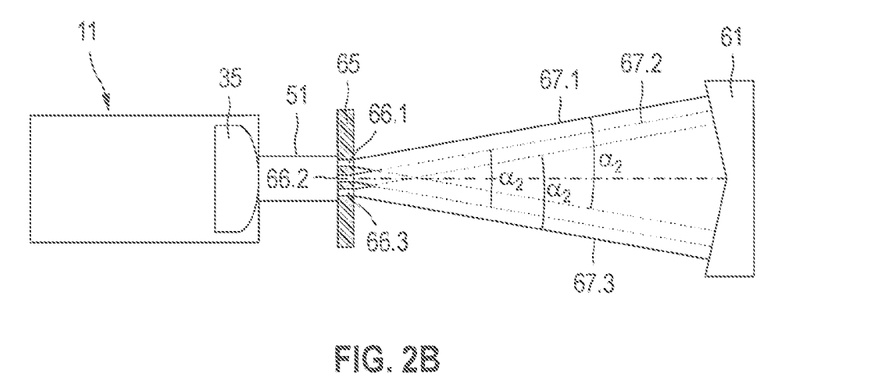

FIG. 2A, B schematically show the optical measurement of the distance from an individual retroreflector 61 with the aid of the device 10 represented in FIG. 1. The laser beam is adjusted to the individual retroreflector 61 by means of a laser beam shaping element, which is embodied as a transmission aperture system with one transmission aperture (FIG. 2A) or as a transmission aperture system with several transmission apertures (FIG. 2B).

The distance measuring device 11 creates the collimated laser beam 51 with the aid of the transmitter lens 35. A laser beam shaping element 62, designed for measuring the distance from individual retroreflectors, is positioned in the beam path of the collimated laser beam 51. In the case of individual retroreflectors, the center of the target object should be hit by the laser beam, so that the reflected reception beam impinges on the receiver lens 36 in every case and is identified by the detector 32. If the laser beam does not hit the center of the individual retroreflector, the reflected reception beam can miss the receiver lens 36 due to parallel offset. In order to reduce the accuracy with which the laser beam must be directed onto the individual retroreflector 61, the laser beam is widened.

The first laser beam shaping element is embodied as a first transmission aperture system 62 with a first transmission aperture 63. The first transmission aperture 63 has a circular aperture geometry with a circle radius. The first transmission aperture 63 creates a partial beam 64 and widens the partial beam 64 to a first beam angle $\alpha_1$, which is larger than a minimum critical angle $\alpha_{min}$ of 1.0 mrad. The first beam angle $\alpha_1$ of the partial beam 64 can be configured via the circle radius of the first transmission aperture 63; the smaller the circle radius of the first transmission aperture 63, the larger the first beam angle $\alpha_1$ of the partial beam. The first transmission aperture 63 also causes the radiant power of the laser beam to be strongly reduced.

A transmission aperture is characterized by its area and it dimensions. The minimum critical angle $\alpha_{min}$ of 1.0 mrad can be converted to a maximum dimension for the transmission aperture, which must not be exceeded by the transmission aperture. The aperture geometry of the transmission aperture determines whether the partial beam has one or more beam angles. Transmission apertures with a circular or square aperture geometry are defined by one dimension (circle radius, lateral length of the square) and create partial beams after the transmission aperture, which have a circular beam cross-section with a beam angle which is constant in circumferential direction. Transmission apertures with an elliptical or rectangular aperture geometry are defined by two dimensions and create partial beams after the transmission aperture, which have an elliptical beam cross-section with a beam angle which varies in circumferential direction, whereby the beam angle of the elliptical partial beam varies in circumferential direction between a maximum beam angle on the large half-axis and a minimum beam angle on the small half-axis of the beam cross-section. Transmission apertures with an arbitrary aperture geometry create partial beams after the transmission aperture with several beam angles which lie between a minimum beam angle and a maximum beam angle.

After the first beam angle 63, the partial beam 64 initially has a small beam diameter, which at close range would make it necessary to direct the partial beam 64 precisely onto the individual retroreflector 61. The second laser beam shaping element 65 represented in FIG. 2B can be used to reduce the required accuracy with which the partial beam 64 must be directed onto the individual retroreflector 61. The second laser beam shaping element is embodied as a second transmission aperture system 65 with three second transmission apertures 66.1, 66.2, 66.3. The second transmission apertures 66 respectively create a partial beam 67.1, 67.2, 67.3 and widen the partial beams 67.1-67.3 to a second beam angle $\alpha_2$ which is larger than the minimum critical angle $\alpha_{min}$ of 1.0 mrad. A central second transmission aperture which is positioned coaxially to the optical axis of the collimated laser beam 51 and a circular distribution of other second transmission apertures around the central second transmission aperture, for example, are suitable as an arrangement of the second transmission apertures 66.1-66.3. The second beam angle $\alpha_2$ of the partial beams 67.1-67.3 can be configured via the circle radius of the second transmission apertures 66.1-66.3; the smaller the circle radius of the second transmission apertures 66.1-66.3, the larger the second beam angle $\alpha_2$ of the partial beams 67.1-67.3.

The radiant power of the laser beam after the transmission aperture system can be adjusted via the transmission area of the transmission aperture system and via the transparency of the transmission apertures. The transmission area of a transmission aperture system is generally defined as the sum of the individual areas of the transmission apertures. If the transmission apertures have the same dimensions, the transmission area can also be calculated as the product of the number of transmission apertures and the area of the transmission apertures. The smaller the ratio of the transmission area to the cross-sectional area of the laser beam directly before the transmission aperture system, the lower the radiant power of the transmitted part of the laser beam after the transmission aperture system.

Figure 3:
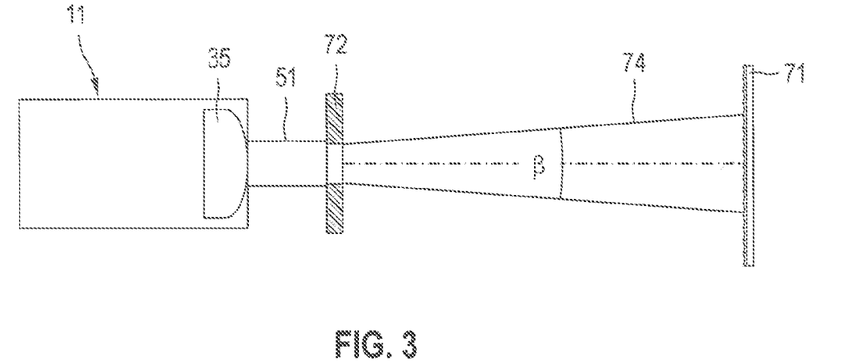
FIG. 3 shows the optical measurement of the distance from a surface retroreflector with the aid of the device represented in FIG. 1.

FIG. 3 schematically shows the optical measurement of the distance from a surface retroreflector 71 with the aid of the device 10 represented in FIG. 1. The distance measuring device 11 generates the collimated laser beam 51 with the aid of the transmitter lens 35. A laser beam shaping element 72, designed for measuring the distance from surface retroreflectors, is positioned in the beam path of the collimated laser beam 51.

The laser beam shaping element 72 is embodied as a shaping aperture with a circular aperture geometry. The shaping aperture 72 reshapes the impinging laser beam 51 into a shaped laser beam 74 with a beam angle $\beta$, whereby the beam angle $\beta$ of the shaped laser beam 74 is smaller than a maximum critical angle $\beta_{max}$ of 0.3 mrad. The beam angle $\beta$ of the shaped laser beam 74 can be configured via the circle radius of the shaping aperture 72. It thereby applies that the larger the circle radius of the shaping aperture 72, the smaller the beam angle $\beta$ of the shaped laser beam 74.

A shaping aperture is characterized by its area and its dimensions. The maximum critical angle $\beta_{max}$ of 0.3 mrad can be converted into a minimum dimension for the shaping aperture, which must not be fallen below by the shaping aperture. The aperture geometry of a shaping aperture determines whether the shaped laser beam has one or more beam angles. Shaping apertures with a circular or square aperture geometry are defined by one dimension (circle radius, lateral length of square) and create laser beams which have a circular beam cross-section with a beam angle which is constant in circumferential direction. Shaping apertures with an elliptical or rectangular aperture geometry are defined by two dimensions and create laser beams which have an elliptical beam cross-section with a beam angle which varies in circumferential direction, whereby the beam angle of the elliptical laser beam varies between a maximum beam angle on the large half-axis and a minimum beam angle on the small half-axis of the elliptical beam cross-section. Shaping apertures with an arbitrary geometry create laser beams after the shaping aperture with several beam angles which lie between a minimum beam angle and a maximum beam angle.

Figure 4A:
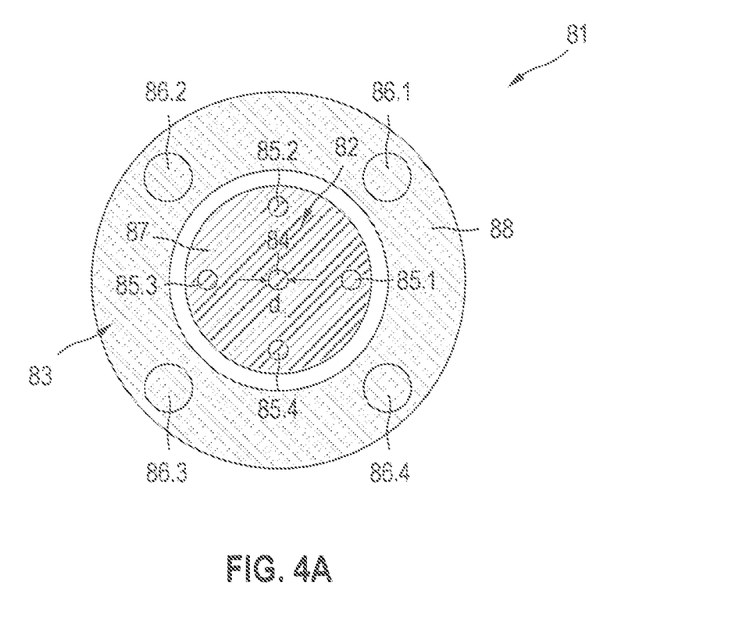
FIG. 4A, B show a first and second embodiment of a first shaping element with laser and reception beam shaping elements for optically measuring the distance from individual retroreflectors at different ranges.
Figure 4B:
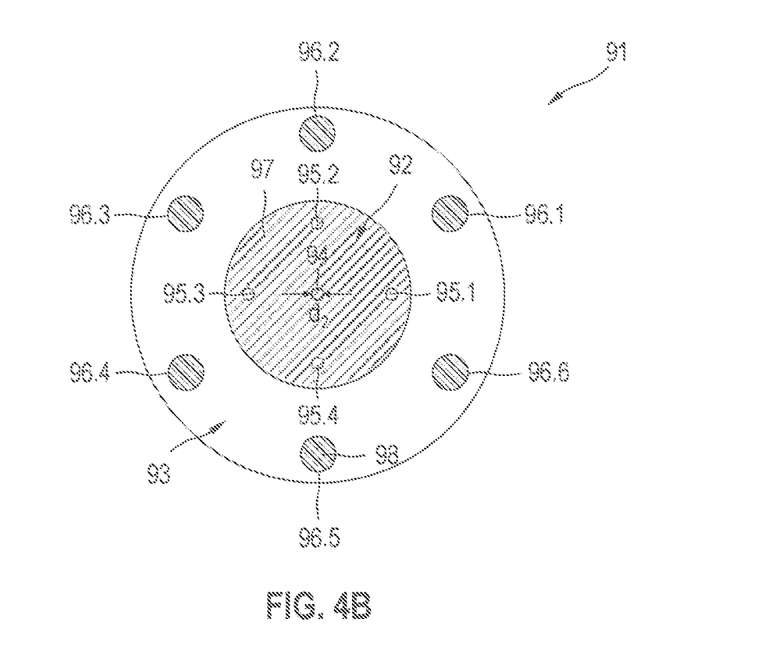

FIG. 4A, B show a first and second embodiment of a first shaping element with laser and reception beam shaping elements, designed for optically measuring the distance from individual retroreflectors at different ranges. The distance is measured, for example, with the aid of the device 10 represented in FIG. 1.

FIG. 4A shows a first embodiment of a first shaping element 81, which has a laser beam shaping element 82 and a reception beam shaping element 83. The laser beam shaping element 82 is embodied as a transmission aperture system with five transmission apertures 84, 85.1-85.4, which subdivide the impinging laser beam into five partial beams. The transmission apertures 84, 85.1-85.4 have a circular aperture geometry with a first diameter $d_1$ and widen the partial beams by diffraction to a beam angle of 1.0 mrad. The reception beam shaping element 83 is embodied as a reception aperture system with four reception apertures 86.1-86.4 which are distributed in a circular array around the laser beam shaping element 82. The reception apertures 86.1-86.4 have a circular aperture geometry with the same diameter.

The radiant power of the transmitted laser beam 41 is designed for measuring the distance from scattered target objects. In the case of scattered target objects, the laser beam is diffused across a large angular range; only a small part of the radiant power is captured by the receiver lens 36 and forwarded to the detector 32. When measuring the distance from reflective target objects, the laser beam is reflected off the target object and impinges on the detector 32 as a directional reception beam. In order to avoid overloading the detector 32 when measuring the distance from reflective target objects, the radiant power of the reception beam 42 impinging on the detector 32 must be significantly lower than the radiant power of the laser beam 41 transmitted from the beam source 31. Thereby, the radiant power can be reduced via measures in the beam path of the laser beam 41 and/or via measures in the beam path of the reception beam 42.

The radiant power of the laser beam 41 can be configured via the transmission area of the transmission aperture system 82 and via the transparency of the transmission apertures 84, 85.1-85.4. The transmission area of a transmission aperture system is generally defined as the sum of the individual areas of the transmission apertures. If the transmission apertures have the same dimensions, as in the embodiment, the transmission area can also be calculated as the product of the number of transmission apertures and the area of the transmission apertures. The smaller the ratio of the transmission area to the cross-sectional area of the laser beam 41 directly before the transmission aperture system 82, the lower the radiant power of the laser beam 41 after the transmission aperture system 82.

As an alternative or in addition to the transmission area, the radiant power of the laser beam 41 can be configured via the transparency of the transmission apertures 84, 85.1-85.4. The transmission apertures 84, 85.1-85.4 in the embodiment are equipped with an optical filter 87, which for example is embodied as a neutral density filter or as a color filter. The attenuation of the laser beam can be configured via the transmission factor of the optical filter, which is defined as the ratio of radiant power of the laser beam let through to radiant power lost. The transparency of the transmission apertures 84, 85.1-85.4 only influence the radiant power of the laser beam 41, whereas the transmission area which is dependent on the dimensions of the transmission apertures 84, 85.1-85.4 changes the radiant power and the beam angles of the partial beams. It is possible to reduce the radiant power of the laser beam 41 via the transparency of the transmission apertures 84, 85.1-85.4 without changing the beam angles of the partial beams.

The radiant power of the reception beam 42 can be configured via the reception area of the reception aperture system 83 and via the transparency of the reception apertures 86.1-86.4. The reception area of a reception aperture system is generally defined as the sum of the individual areas of the reception apertures 86.1-86.4. If the reception apertures have the same dimensions, as in the embodiment, the reception area can be calculated as the product of the number of reception apertures and the area of the reception apertures. The smaller the ratio of the reception area to the cross-sectional area of the reception beam 42 directly before the reception aperture system 83, the lower the radiant power of the reception beam 42 after the reception aperture system 83. The attenuation of the reception beam 42 via a restriction of the reception area is independent of the wavelength of the beam source 31, so extraneous light, for example sunlight with a broad wavelength spectrum, is also attenuated without additional effort.

The radiant power of the reception beam 42 can be adjusted via the transparency of the reception apertures 86.1-86.4, as an alternative or in addition to the reception area. The reception apertures 86.1-86.4 in the embodiment are equipped with an optical filter 88 which, for example, is embodied as a neutral density filter or as a color filter. The attenuation of the reception beam can be configured via the transmission factor of the optical filter, which is defined as the ratio of radiant power of the reception beam let through to radiant power lost.

The optical filters 87, 88 are embodied as neutral density filters or color filters. In the case of neutral density filters, a broad wavelength range is attenuated, whereas in the ease of color filters a narrow wavelength range around the wavelength of the beam source 31 is attenuated. Attenuating the radiant power via the transparency of an aperture (transmission aperture or reception aperture) offers the possibility to adjust the radiant power without changing the beam angle of the diffracted beam. The use of neutral density filters has the benefit of attenuating a broad wavelength range also comprising extraneous light, in addition to the wavelength of the beam source 31. Thus neutral density filters are especially suitable when extraneous light should also be attenuated. Furthermore, neutral density filters have the benefit of being available at low cost as plastic foils.

FIG. 4B shows a second embodiment of a first shaping element 91 which has a laser beam shaping element 92 and a reception beam shaping element 93. The laser beam shaping element 92 is embodied as a transmission aperture system with five circular transmission apertures 94, 95.1-95.4 which are positioned around the optical axis of the collimated laser beam 51, in the same way as the transmission apertures 84, 85.1-85.4 of FIG. 4A. The reception beam shaping element 93 is embodied as a reception aperture system with six circular reception apertures 96.1-96.6 which are positioned in a ring around the laser beam shaping element 92.

The transmission apertures 94, 95.1-95.6 of FIG. 4B differ in diameter from the transmission apertures 84, 85.1-85.4 of FIG. 4A. In the embodiment, the transmission apertures 94, 95.1-95.4 have a second diameter $d_2$ and widen the five partial beams to a beam angle of 2.0 mrad. The circular reception apertures 96.1-96.6 of FIG. 4B have a smaller diameter than the circular reception apertures 86.1-86.4 of FIG. 4A. The transmission apertures 94, 95.1-95.4 and the reception apertures 96.1-96.6 are embodied as partially transparent. The transmission apertures 94, 95.1-95.4 are equipped with an optical filter 97 and the reception apertures 96.1-96.6 are equipped with an optical filter 98. The radiant power impinging on the detector 32 can be adjusted via the transmission factor of the optical filters 97, 98.

The transmission apertures 84, 85.1-85.4, 94, 95.1-95.4 and reception apertures 86.1-86.4, 96.1-96.6 have circular aperture geometries. Circular transmission and reception apertures represent the preferred aperture geometry. The transmission apertures 84, 85.1-85.4 of FIG. 4A have a diameter $d_1$ and create partial beams with a beam angle of 1.0 mrad which is constant in circumferential direction. The transmission apertures 94, 95.1-95.4 of FIG. 4B have a diameter $d_2$ and create partial beams with a beam angle of 2.0 mrad which is constant in circumferential direction. In principle, transmission and reception apertures with a non-circular aperture geometry can also be used. In the case of transmission and reception apertures with an elliptical or rectangular aperture geometry, the beams after the aperture system have an elliptical beam cross-section with beam angles which vary in circumferential direction.

Figure 5A:
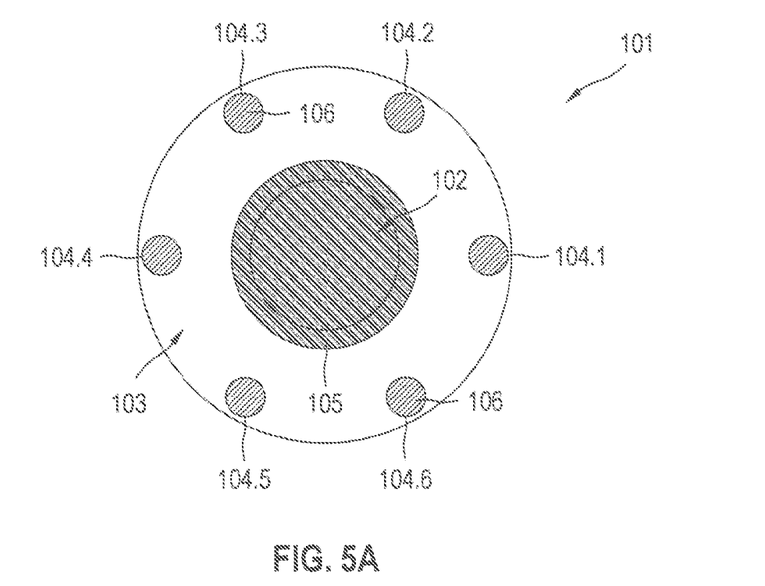
FIG. 5A, B show a first and second embodiment of a second shaping element with laser and reception beam shaping elements for optically measuring the distance from surface retroreflectors at different ranges.
Figure 5B:
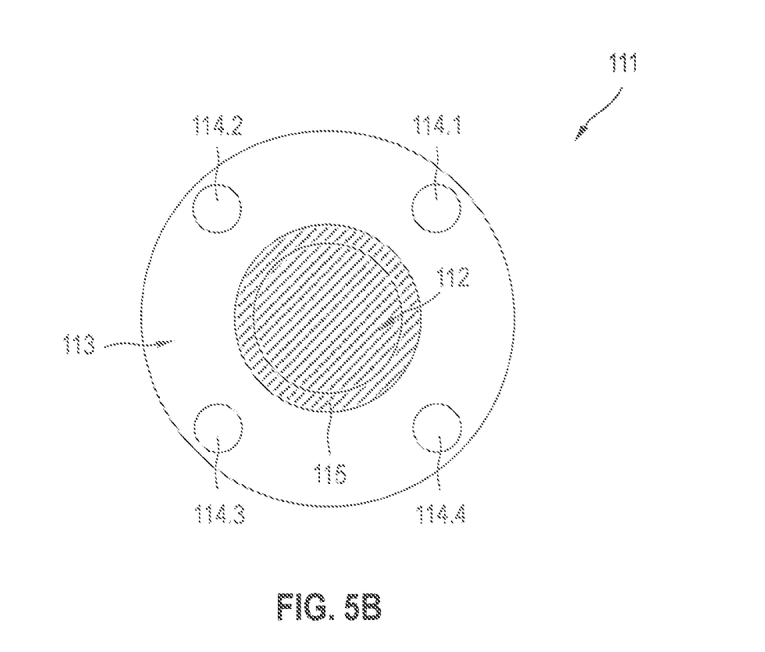

FIG. 5A, B show a first and second embodiment of a second shaping element with laser and reception beam shaping elements which are designed for optically measuring the distance from surface retroreflectors at different ranges. The distance is measured, for example, with the aid of the device 10 represented in FIG. 1.

FIG. 5A shows a first embodiment of a second shaping element 101, which has a laser beam shaping element 102 and a reception beam shaping element 103. The laser beam shaping element 102 is embodied as a first shaping aperture which homogenizes the impinging laser beam and reshapes it into a shaped laser beam with a first beam angle $\beta_1$. Diffraction of the laser beam cannot be completely avoided, whereby the first beam angle $\beta_1$ of the shaped laser beam is smaller than the maximum critical angle of $\beta_{max}$ 0.3 mrad. The reception beam shaping element 103 is embodied as a reception aperture system with six circular reception apertures 104.1-104.6 which are positioned in a circle around the laser beam shaping element 102.

The reduction in radiant power of the impinging reception beam, which is necessary in the case of surface retroreflectors, can occur via the shaping aperture 102 and the reception apertures 104.1-104.6. The radiant power of the laser beam 41 can be configured via the area and the transparency of the shaping aperture 102 and the radiant power of the reception beam 42 via the reception area of the reception aperture system 103 and the transparency of the reception apertures 104.1-104.6. The shaping aperture 102 and the reception apertures 104.1-104.6 are embodied as partially transparent in the embodiment. The shaping aperture 102 is equipped with an optical filter 105 and the reception apertures 104.1-104.6 are equipped with an optical filter 106.

FIG. 5B shows a second embodiment of a second shaping element 111, which has a laser beam shaping element 112 and a reception beam shaping element 113. The laser beam shaping element 112 is embodied as a second shaping aperture which homogenizes the impinging laser beam and reshapes it into a shaped laser beam with a second beam angle $\beta_2$.

The reception beam shaping element 113 is embodied as a reception aperture system with four circular reception apertures 114.1-114.4 which are positioned in a circle around the laser beam shaping element. The reception apertures 114.1-114.4 of FIG. 5B have a larger diameter than the reception apertures 104.1-104.6 of FIG. 5A.

The second shaping aperture 112 is embodied as partially transparent for the wavelength of the laser beam. Also, the shaping aperture 112 is equipped with an optical filter 115 which has a transmission factor less than 100% in the range of the wavelength, for example 20%. The reception apertures 114.1-114.4 are embodied in the embodiment as completely transparent for the reflective reception beam. As an alternative, the reception apertures 114.1-114.4 can be embodied as partially transparent for the reflected reception beam. The radiant power of the reception beam which impinges on the detector 32 can be configured via the transparency of the reception apertures 114.1-114.4, in addition to the reception area of the reception aperture system.

The shaping apertures 102, 112 and the reception apertures 104.1-104.6, 114.1-114.4 have circular aperture geometries. Circular shaping and reception apertures represent the preferable aperture geometry. The shaping apertures 102, 112 have a circle diameter and create partial beams with a beam angle which is constant in circumferential direction. In principle, shaping and reception apertures with a non-circular geometry can also be used. In the case of shaping and reception apertures with an elliptical or rectangular aperture geometry, the beams after the apertures have a beam cross-section with beam angles varying in circumferential direction.

Figure 6:
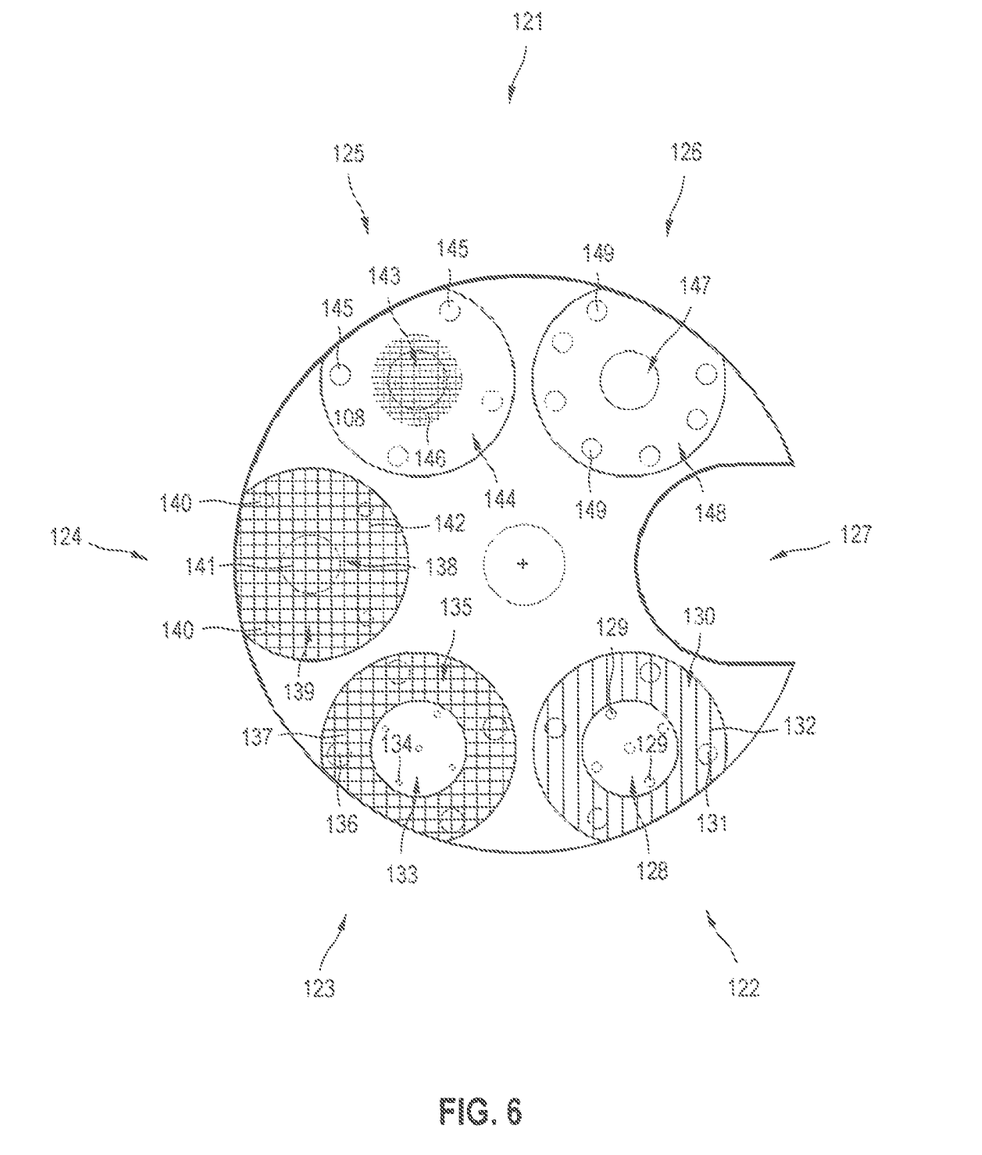
FIG. 6 shows a first embodiment of an adjustment device with two first shaping elements which are designed for optically measuring the distance from individual retroreflectors, and three second shaping elements which are designed for optically measuring the distance from surface retroreflectors.

FIG. 6 shows a first embodiment of an adjustment device 121 with two first shaping elements 122, 123 which are designed for optically measuring the distance from individual retroreflectors, three second shaping elements 124, 125, 126 which are designed for optically measuring the distance from surface retroreflectors, and a beam outlet 127 which is designed for measuring the distance from scattered target objects. The distance is measured, for example, with the aid of the device 10 represented in FIG. 1.

The first shaping element 122 comprises a laser beam shaping element 128 embodied as a transmission aperture system with five circular transmission apertures 129 and a reception beam shaping element 130 embodied as a reception aperture system with four circular reception apertures 131, whereby the reception apertures 131 are equipped with an optical filter 132 and are embodied as partially transparent for the reflected reception beam. The other first shaping element 123 comprises a laser beam shaping element 133 embodied as a transmission aperture system with five circular transmission apertures 134 and a reception beam shaping element 136 embodied as a reception aperture system 135 with four circular reception apertures, whereby the reception apertures 136 are equipped with an optical filter 137 and embodied as partially transparent for the reflected reception beam.

The first shaping elements 122, 123 differ from one another in the diameter of the transmission apertures 129, 134, in the diameter of the reception apertures 131, 136 and in the transparency of the reception apertures 131, 136. The first shaping element 122 is intended, for example, for distance measurements at a range of 30 m to 100 m and the first shaping element 123 is intended for distance measurements ranging up to 30 m.

The second shaping element 124 comprises a laser beam shaping element 138 embodied as a circular shaping aperture and a reception beam shaping element 139 embodied as a reception aperture system with four circular reception apertures 140. The shaping aperture 138 is embodied as partially transparent for the laser beam by means of an optical filter 141 and the reception apertures 140 are embodied as partially transparent for the reflected reception beam by means of an optical filter 142. The other second shaping element 125 comprises a laser beam shaping element 143 embodied as a circular shaping aperture and a reception beam shaping element 144 embodied as a reception aperture system with four circular reception apertures 145, whereby the shaping aperture 143 is embodied as partially transparent for the laser beam by means of an optical filter 146. The other second shaping element 128 comprises a laser beam shaping element 147 embodied as a circular shaping aperture, and a reception beam shaping element 148 embodied as a reception aperture system with seven circular reception apertures 149, whereby the shaping aperture 147 and the reception apertures 149 are embodied as completely transparent for the laser beam and the reception beam.

The second shaping elements 124, 125, 126 differ from one another in the diameter of the shaping aperture 138, 143, 147, in the transparency of the shaping aperture 138, 143, 147, in the diameter of the reception apertures 140, 145, 149, in the number of reception apertures 140, 145, 149 and/or in the transparency of the reception apertures 140, 145, 149. The second shaping element 124 is intended, for example, for measuring distances from cat's eyes at a range of up to 10 m, the second shaping element 125 for measuring distances from cat's eyes ranging from 10 m to 100 m, and the second shaping element 126 for measuring distances from cat's eyes at ranges over 100 m. The specified ranges are given as an example for well reflecting cat's eyes and are dependent on the quality of the surface retroreflector. Thereby, the rule applies that the attenuation of the laser beam and the reception beam should become less with the decreasing quality of the surface retroreflector.

Figure 7A:
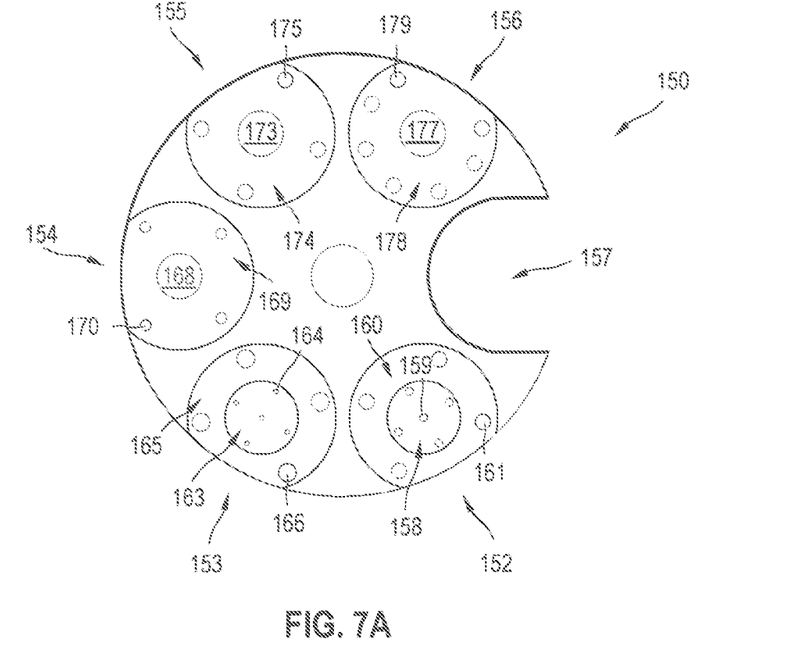
FIG. 7A, B show a second embodiment of an adjustment device with several laser and reception beam shaping elements which are arranged in a first rotating wheel, and several attenuation elements which are arranged in a second rotating wheel.

FIG. 7A, B show a second embodiment of an adjustment device with a first adjustment device 150 (FIG. 7A) and a second adjustment device 151 (FIG. 7B), whereby the first adjustment device 150 has first shaping elements for measuring distances from individual retroreflectors and second shaping elements for measuring distances from surface retroreflectors and the second adjustment device 151 has attenuation elements for attenuating the radiant power of the laser and/or reception beam. The distance measurement occurs, for example, with the aid of the device 10 represented in FIG. 1.

The first adjustment device comprises two shaping elements 152, 153 embodied for optically measuring distances from individual retroreflectors, three second shaping elements 154, 155, 156 embodied for optically measuring distance from surface retroreflectors, and a beam outlet 157 embodied for measuring the distance from scattered target objects. The first shaping element 152 comprises a laser beam shaping element 158 embodied as a transmission aperture system with five circular transmission apertures 159 and a reception beam shaping element 160 embodied as a reception aperture system with four circular reception apertures 161. The other first shaping element 153 comprises a laser beam shaping element 163 embodied as a transmission aperture system with five circular transmission apertures 164 and a reception beam shaping element 166 embodied as a reception aperture system 165 with four circular reception apertures.

The first shaping elements 152, 153 differ from one another in the diameter of the transmission apertures 159, 164 and in the diameter of the reception apertures 161, 166. The first shaping element 152, is intended, for example for measuring distances at a range of 30 m to 100 m, and the first shaping element 153 is intended for measuring distances at ranges of up to 30 m.

The second shaping element 154 comprises a laser beam shaping element 168 embodied as a circular shaping aperture and a reception beam shaping element 169 embodied as a reception aperture system with four circular reception apertures 170. The other second shaping element 155 comprises a laser beam shaping element 173 embodied as a circular shaping aperture and a reception beam shaping element 174 embodied as a reception aperture system with four circular reception apertures 175. The other second shaping element 156 comprises a laser beam shaping element 177 embodied as a circular shaping aperture and a reception beam shaping element 178 embodied as a reception aperture system with seven circular reception apertures 179.

The second shaping elements 154, 155, 156 differ from one another in the diameter of the shaping aperture 168, 177, 177, in the diameter of the reception apertures 170, 175, 179 and/or in the number of reception apertures 170, 175, 179, The second shaping element 154, is intended, for example for measuring distances from reflective foils at a range of up to 5 m, the second shaping element 155 is intended for measuring distances from reflective foils at a range of 5 m to 30 m and the second shaping element 156 is intended for measuring distances from reflective foils at ranges over 30 m. The specified ranges are given as an example for well reflecting reflective foils and are dependent on the quality of the surface retroreflector. Thereby, the rule applies that the attenuation of the laser beam and the reception beam should become less with the decreasing quality of the surface retroreflector.

Figure 7B:
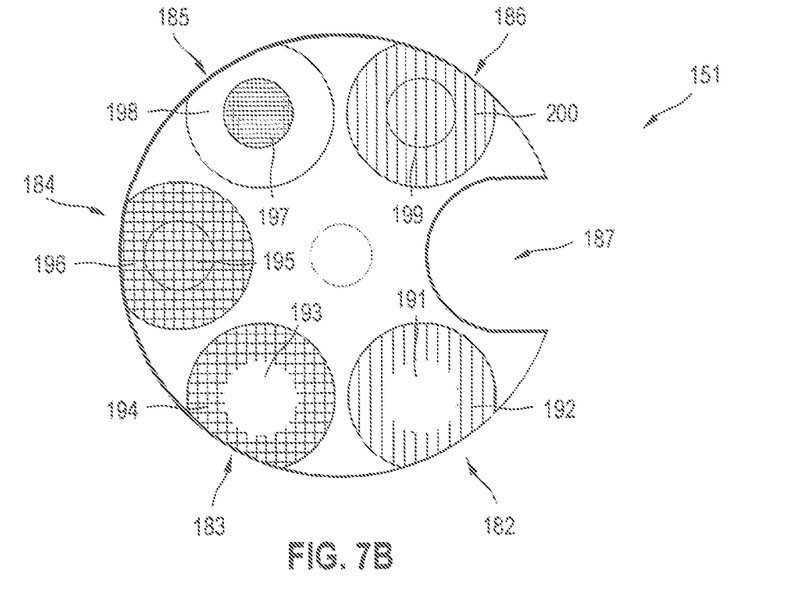

The second adjustment device 151 comprises live attenuation elements 182-186, embodied for measuring distances from reflective target objects, and a beam outlet 187, embodied for measuring distances from scattered target objects.

The attenuation elements 182-186 respectively comprise a laser beam attenuation element, which can be positioned in the beam path of the laser beam 41, and a reception beam attenuation element, which can be positioned in the beam path of the reception beam 42. When measuring distances from a reflective target object, the shaping elements 152-156 of the first adjustment device 150 and the attenuation elements 182-186 of the second adjustment device 151 can be combined with one another.

The first attenuation element 182 comprises a completely transparent laser beam attenuation element 191 and a partially transparent first reception beam attenuation element 192 with a first transmission factor $TE_1$. The second attenuation element 183 comprises a completely transparent second laser beam attenuation element 193 and a partially transparent second reception beam attenuation element 194 with a transmission factor $TE_2$. The first and second reception beam attenuation element 192, 194 differ from one another in the transmission factor $TE_1$, $TE_2$, for example the first transmission factor $TE_1$ of the first reception beam attenuation element 192 is twice as large as the second transmission factor $TE_2$ of the second reception beam attenuation element 194.

The third attenuation element 184 comprises a partially transparent third laser beam attenuation element 195 and a partially transparent third reception beam attenuation element 196. In the embodiment, the transmission factor $TS_3$ of the third laser beam attenuation element 195 and the transmission factor $TE_3$ of the third reception beam attenuation element 196 match. As an alternative, the transmission factors $TS_3$, $TE_3$ of the third laser beam attenuation element 195 and of the third reception beam attenuation element 196 are different from one another.

The fourth attenuation element 185 comprises a partially transparent fourth laser beam attenuation element 197 with a fourth transmission factor $TS_4$ and a completely transparent fourth reception beam element 198. The transmission factor $TS_4$ of the fourth laser beam attenuation element 197 is for example 5%.

The fifth attenuation element 186 comprises a partially transparent fifth laser beam attenuation element 199 with a fifth transmission factor $TS_5$ and a partially transparent fifth reception beam attenuation element 200 with a fifth transmission factor $TE_5$. In the embodiment, the transmission factor $TS_5$ of the fifth laser beam attenuation element 199 and the transmission factor $TE_5$ of the fifth reception beam attenuation element 200 match. As an alternative, the transmission factors $TS_5$, $TE_5$ of the fifth laser beam attenuation element 199 and of the fifth reception beam attenuation element 200 can be different from one another.

The invention claimed is:

1. A device for optically measuring a distance from a reflective target object which is embodied as an individual retroreflector or as a surface retroreflector, comprising:
a beam source, wherein the beam source is a first electro-optical component and wherein the beam source transmits a laser beam;
a detector, wherein the detector is a second electro-optical component and wherein the detector receives a reception beam reflected off the reflective target object;
a beam shaping system with a transmitter lens which shapes the laser beam and a receiver lens which shapes the reception beam;
a laser beam shaping element, wherein the laser beam shaping element is disposable in a path of the laser beam, wherein the laser beam shaping element is a transmission aperture system with at least one transmission aperture, and wherein the at least one transmission aperture creates a partial beam and widens the partial beam to one or more beam angles which are no smaller than a minimum critical angle of 1.0 mrad; and
a further laser beam shaping element, wherein the further laser beam shaping element is disposable in the path of the laser beam, wherein the further laser beam shaping element is a first shaping aperture, and wherein the first shaping aperture reshapes the laser beam into a shaped laser beam with one or more beam angles and the beam angles are smaller than a maximum critical angle of 0.3 mrad.

2. The device according to claim 1, wherein the transmission aperture system has multiple transmission apertures, wherein the multiple transmission apertures create multiple partial beams and the multiple partial beams respectively widen to one or more beam angles which are no smaller than the minimum critical angle of 1.0 mrad.

3. The device according to claim 1, wherein the at least one transmission aperture is partially transparent for the laser beam.

4. The device according to claim 1, wherein the laser beam shaping element includes a first laser beam shaping element that is a first transmission aperture system with at least one first transmission aperture and a second laser beam shaping element that is a second transmission aperture system with at least one second transmission aperture, wherein the first and the second transmission aperture systems differ from one another.

5. The device according to claim 4, wherein the first and the second transmission aperture systems differ from one another in a dimension of the at least one first transmission aperture and the at least one second transmission aperture.

6. The device according to claim 4, wherein the first and the second transmission aperture systems differ from one another in a number of transmission apertures, in an area of the transmission apertures, and/or in a transparency of the transmission apertures.

7. The device according to claim 1, wherein the shaping aperture is partially transparent for the laser beam.

8. The device according to claim 1 further comprising an additional laser beam shaping element, wherein the additional laser beam shaping element is disposable in the path of the laser beam, wherein the additional laser beam shaping element is a second shaping aperture and wherein the first and the second shaping apertures differ from one another in a dimension of the first and the second shaping apertures, in an area of the first and the second shaping apertures, and/or in a transparency of the first and the second shaping apertures.

9. The device according to claim 1 further comprising a first reception beam shaping element, wherein the first reception beam shaping element is disposable in a path of the reception beam and wherein the first reception beam shaping element is a first reception aperture system with at least one first reception aperture.

10. The device according to claim 9, wherein the first reception aperture system has multiple reception apertures which are spaced apart from one another.

11. The device according to claim 9, wherein the at least one first reception aperture is partially transparent for the reception beam.

12. The device according to claim 9 further comprising a second reception beam shaping element, wherein the second reception beam shaping element is disposable in the path of the reception beam, wherein the second reception beam shaping element is a second reception aperture system with at least one second reception aperture, and wherein the first and the second reception aperture systems differ from one another.

13. The device according to claim 12, wherein the first and the second reception aperture systems differ from one another in a number of reception apertures, in an area of the reception apertures, and/or in a transparency of the reception apertures.

14. The device according to claim 9, wherein the laser beam shaping element and the first reception beam shaping element are disposed on a first shaping element and wherein the first shaping element is disposable in the path of the laser beam and in the path of the reception beam.

15. The device according to claim 14 further comprising a second laser beam shaping element, wherein the second laser beam shaping element is a shaping aperture, and a second reception beam shaping element, wherein the second reception beam shaping element is a reception aperture system, wherein the second laser beam shaping element and the second reception beam shaping element are disposed on a second shaping element, and wherein the second shaping element is disposable in the path of the laser beam and in the path of the reception beam.

16. The device according to claim 15, wherein at least one first shaping element and at least one second shaping element are provided.

17. The device according to claim 16, wherein multiple first shaping elements and/or multiple second shaping elements are provided.

* * * * *